United States Patent
Blount

(10) Patent No.: US 6,270,694 B1
(45) Date of Patent: *Aug. 7, 2001

(54) FLAME RETARDANT COMPOSITIONS UTILIZING AMINO CONDENSATION COMPOUNDS

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 0 days.

This patent is subject to a terminal disclaimer.

(21) Appl. No.: 09/422,160

(22) Filed: Oct. 22, 1999

Related U.S. Application Data

(62) Division of application No. 09/149,847, filed on Sep. 8, 1998, which is a division of application No. 08/801,776, filed on Feb. 14, 1997, now Pat. No. 5,788,915, and a division of application No. 08/723,779, filed on Sep. 30, 1996, now Pat. No. 5,854,309.

(51) Int. Cl.[7] .......................... C09K 21/00; C09K 21/02; C09K 21/06; C09K 21/14
(52) U.S. Cl. .......................... 252/607; 252/608; 252/609; 252/601; 528/259; 523/179
(58) Field of Search .................... 252/609, 607, 252/608, 601; 525/428; 528/259; 523/179

(56) References Cited

U.S. PATENT DOCUMENTS

| | | | | |
|---|---|---|---|---|
| 2,244,184 | * | 6/1941 | Austin et al. | . |
| 3,629,052 | * | 12/1971 | Knoepfler et al. | 161/170 |
| 4,968,772 | * | 11/1990 | Whiteside | 528/230 |
| 5,418,282 | * | 5/1995 | Wiehn | 524/735 |
| 5,596,029 | * | 1/1997 | Goebelbecker et al. | 523/179 |
| 5,788,915 | * | 8/1998 | Blount | 252/609 |
| 5,854,309 | * | 12/1998 | Blount | 523/179 |

\* cited by examiner

*Primary Examiner*—Joseph D. Anthony

(57) ABSTRACT

Flame retardant compositions of this invention are produced by incorporating a urea-organic compound condensate into a flammable organic material. The urea-organic compounds condensate are produced by heating urea organic compounds that will condensate with or react with isocyanic acid and/or cyanic acid or heating urea first then reacting the condensation compounds with other organic compounds. The urea-organic compound condensate may be mixed with or reacted with carbonization auxiliaries, aldehydes and fillers to produce a urea-organic compound condensate composition which is incorporated in more flammable organic compositions such as polyurethanes, polyester resins, epoxy resins, vinyl resins and other resins. The urea-organic compound condensate salts of phosphorus, boron or sulfur containing compounds and the urea-organic compound condensate-aldehyde resins may also be used as the flame retardant compound in this invention. For example, polyurethane foams can be rendered less flammable with the urea-organic compound condensate or compositions and utilized as insulating materials.

21 Claims, No Drawings

FLAME RETARDANT COMPOSITIONS UTILIZING AMINO CONDENSATION COMPOUNDS

This application is a division of Ser. No. 09/149,847 filed Sep. 8, 1998 now pending, which is a division of patent application Ser. No. 08/801,776, filed Feb. 14, 1997, now U.S. Pat. No. 5,788,915, and Ser. No. 08/723,779 filed Sep. 30, 1996, now U.S. Pat. No. 5,854,309.

FIELD

The invention concerns urea being heated with other organic compounds containing an active hydrogen and other active radicals to produce urea-organic compounds condensate. The invention also concerns their preparation and use. The urea-organic compound condensates are useful to produce flame retardant plastics, natural products, resins and compounds. These flame retardant resins and compounds may be reacted with phosphorus and/or boron containing compounds to produce other flame retardant compounds. The urea-organic compound condensate resins and compounds may also be reacted with aldehydes to produce urea-organic compounds condensate-aldehyde resins for use as molding resin or as a flame retardant compound. The urea-organic compound condensates will react with polyisocyanates to produce foams for insulation and other products. The urea-unsaturated polyester condensate will react with unsaturated compounds such as styrene in the presence of a catalyst to produce flame retarded polyester resins.

BACKGROUND

The heating of urea with other organic compounds to produce flame retardant, urea-organic compounds condensates, is novel. The condensation of isocyanuric acid and/or cyanic acid, (which are produced by heating urea), with other reactive organic compounds to produce flame retardant resins and compounds is novel. The urea-organic compound condensates and their phosphorus and/or boron salts are used as flame retardant compounds in plastics and natural products. Urea and melamine were utilized as a flame retardant compound by Fracalossi, et al., in U.S. Pat. No. 4,385,131. Melamine was utilized as flame retardant compounds in polyurethanes by Yukuta, et al., in U.S. Pat. No. 4,221,875 and by Grinbergs et al., in U.S. Pat. No. 4,745,133. Amino phosphates was utilized by Blount in U.S. Pat. No. 5,010,113.

What is lacking and what is needed are useful inexpensive nitrogen containing organic resins and compounds with a plurality of nitrogen moieties. The urea-organic compound condensate and/or their salts of this invention are novel flame retardant compounds. What is additionally lacking are compositions having such urea-organic compound condensates and/or their salts employed therein.

SUMMARY

In one aspect, the invention comprises urea-organic compounds condensates. Another aspect of the invention is a process to prepare urea-organic compound condensate comprising serially contacting (A) urea
(B) organic compounds with active hydrogen or radical that will condensate or react with urea; under conditions sufficient to prepare the urea-organic compound condensate;
(C) water;
the urea and the reactive compound are mixed, heated and reacted. The water may be added to the condensate then heated or may be added with the urea and organic compound before heating or utilized to make emulsions.

In another aspect, the invention comprises urea condensation-organic compound condensate salt of phosphorus and/or boron containing compound and a process to prepare a urea-organic compound condensate salt of a phosphorus and/or boron containing compound employing phosphorus and/or boron containing compound that will react with the urea-organic compound condensate under conditions sufficient to prepare the urea-organic compound condensate salt of a phosphorus and/or boron containing compound, and a process to prepare a urea-organic compound condensate salts of a phosphorus and/or a boron containing compound comprising serially contacting (A) urea
(B) organic compound that will condensate or react with urea
(D) phosphorus and/or boron containing compound that will react with a urea-organic compound condensate.

An addition aspect of this invention is the production of urea-organic compound condensate-aldehyde resins and a process to prepare urea-organic compound condensate-aldehyde resins under conditions sufficient to prepare the urea-organic compound condensate-aldehyde resin comprising serially contacting (A) urea
(B) organic compound that will condensate or react with urea
(C) water
(E) aldehyde
(J) a basic or acidic catalyst An additional aspect of the invention is use of the urea-organic compound condensates in the production of urea-organic compound condensate salts of phosphorus and/or boron compounds and in the production of urea-organic compound condensate-aldehyde resins. The flame retardant use comprises contacting an otherwise more flammable organic material with the urea-organic compound condensate and/or urea-organic compound condensate salts of phosphorus and/or boron containing compounds and/or urea-organic compound condensate-aldehyde resins and/or urea-organic compound condensate composition thereof under conditions sufficient to lower the combustibility of the flammable organic material, for example plastics, natural products or polyurethanes. Thus, a further aspect of the invention is a flame-retardant composition comprising an otherwise more flammable organic material incorporated therewith a flame retardant amount of a urea-organic compound condensate and/or a urea-organic compound condensate salt of a phosphorus and/or boron containing compound, and/or urea-organic compound condensate-aldehyde resin, carbonization auxiliaries and fillers.

The flame-retardant resins and compounds of this invention are produced by heating urea (Component A) with a reactive organic compound (Component B) to above the melting point of urea to about 140–170 degree C. at ambient or elevated pressure for 1–3 hrs. Upon heating above the melting point urea form a very reactive compound isocyanic acid and/or cyanic acid which will react with itself or other organic or inorganic compounds especially organic compounds which have reactive hydrogens. In order to increase the flame retardant properties and carbonization properties of the urea-organic compound condensate, a carbonization auxiliary, such as, phosphorus acidic compounds, organic phosphorus compounds, boron compounds, etc., that will react with a urea-organic compound condensate, is added to the melted urea-organic compound condensate, mixed and/ or reacted. Other carbonization auxiliaries may be mixed with the urea-organic compound condensate to produce the flame retardant urea-organic compound condensate composition. The urea condensation-organic compound condensate may be further reacted with an aldehyde in the presence of a neutral or basic or acidic catalyst by mixing and heating the urea-organic compound condensate with the aldehyde, usually in an aqueous medium, to just below the boiling point of the components at ambient or an elevated pressure thereby producing a urea-organic compound condensate-aldehyde resin. Fillers and carbonization auxiliaries may be added to or reacted with the urea-organic compound condensates or the urea-organic compound condensate-aldehyde resin. The urea-organic compound condensates and urea-organic compound condensate-aldehyde resins with or without carbonization auxiliaries and fillers may be reacted with or added to or applied to a more flammable organic material.

COMPONENT A

Urea is utilized as component A and may be in the form of a powder, crystals or a solid. Any suitable urea may be utilized that will react with a reactive organic compound. Urea is utilized in the amount of 50 to 100 parts by weight.

COMPONENT B

Any suitable reactive organic compound, except amino compounds which must be added with another organic compound, that will react with isocyanic acid and/or cyanic acid may be utilized in this invention. Suitable organic saturated, unsaturated or substituted compounds may be an aliphatic, aromatic, cyclic, aliphatic-aromatic or aliphatic-cyclic compound such as, but not limited to, alcohols, polyalcohols, epoxides, polyepoxides, epihalohydrins, organic acids, polycarboxylic acids and hydrides, thioalcohols, phenols, thiophenols, halogenated alcohols and polyalcohols, halogenated organic compounds, halogenated organic acids and polycarboxylic acids, sulphonic acid chlorides, organic ester, organic ethers, thioethers, ketones, nitrites, sulphonic acids, imides, alkyl carbonates, oils, fats, carbohydrates, cellulose, lignin, wood flour, acrylic acid, alkyl acrylic acids, allyl alcohol, allyl chloride, polyvinyl alcohol, organic phosphates, phosphites, phosphonates and phosphorus esters, alkyl chlorophosphines, phosgene, ammonium carbonate, alkyl carbamates, alkyl isocyanates, polyisocyanates, sulfamic acid, ammonium sulfamate, amino compounds, amines, polyamines,, thioureas, alkylanolamine, polyamides with free —$NH_2$ or —COOH radicals, amidines, amides, aldimines, ketimines, polyester with free —OH or COOH radicals and mixtures thereof. The organic material that will react with urea is utilized in the amount of 25 to 200 parts by weight.

The organic compound may contain one or more of the following radicals: —Cl, —Br, —F, —OH, —COOH, —CN, —$NO_2$, —COCl, —COBr. —NCO, —C=C—, —$NH_2$,

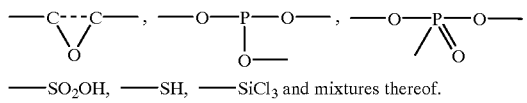

—$SO_2OH$, —SH, —$SiCl_3$ and mixtures thereof.

Suitable epoxy compounds include but not limited to alkyl epoxide such as ethylene oxide, propylene oxide, butylene oxides, trichlorobutylene oxide, epihalohydrins, 2,3-epoxybutane, 1,2-epoxydecane, 1,2,-epoxyactadecane; unsaturated ether, epoxide such as ally glycedyl ether; dialkylatable epoxides such as tert-butyl glycidyl ether; and other polyepoxides and mixtures thereof. The epihalohydrins are preferred.

Any suitable alcohol or polyalcohols may be chemically reacted, suitable alcohols include, but are not limited to, aliphatic alcohols such as methanol, ethanol, sec-butanol, 1-buten-4-ol and propargyl alcohol and substituted alcohols such as 2-fluoroethanol, 2-chloroethanol, 2-bromoethanol, 2-cyanoethanol; aromatic alcohols such as phenol and benzyl alcohols and mixtures thereof. Alkyl alcohols are preferred.

Suitable polyalcohols include, but are not limited to, diols such as ethylene glycol, propylene, glycol butylene glycol, polyethylene glycol, polypropylene glycol, polybutylene glycol, triols such as 1,2,-propanetriol, 1,2,3-butanetriol, 1,2,10decanetriol, 2,2-bis(hydroxymethyl)-1-octanol and 2-methyl2-(2-hydroxyethoxy)-1-1,3-propanediol, sucrose, sucrose amine polyols, polypropylene polyols, polybutylene polyols, phenyl polyols, phenylamine polyols, polyether polyols, polyepichlorohydrin, polyepibromohydrin, sorbitol, pentaerythirtol, polythioether polyols, polyacetal polyols, polycarbonate polyols, polyester polyols, polyesteramide, polyamide polyol, modified or unmodified natural polyols, carbohydrates, cellulose and mixtures thereof. The polyols may contain halo, cyano, ether, thioether, sulfoxy and ocyl ester radicals. The carbohydrate polyols are the preferred polyol.

Any suitable isocyanate may be used in this invention, organic polyisocyanates are preferred. The commercial available ones are preferred such as tolylene-2-4-diisocyanate, tolylene-2,6-diisocyanate, polymethylene polyphenyl isocyanate, diphenyl methane 4,4'diisocyanate, 3-methyldiphenyl-methyane-4,4-diisocyanate, m- and -p-phenylenediisocyanate, polyphenylpolymethyleneisocyanates obtained by phosgenation, commercially known as "crude MDI", modified polyisocyanates and mixtures thereof. Suitable organic polyisocyanates are exemplified by the organic diisocyanates which are compounds of the general formula:

$$O=C=N-R-N=C=O$$

wherein R is a divalent organic radical such as an alkylene, aralkylene or arylene radical. Such radicals contain 2 to 20 carbon atoms. Unsaturated isocyanate compounds may also be used.

Urethane catalyst such as tertiary amines, alkali metal salts of weak acids, inorganic bases, organometallic compounds such as organotin compounds may be used in this invention. Surfactants and foam stabilizers such as a monhydrolizable silicone glycol copolymer may also be used in this invention. Surfactants may also be used to assist in the dispersion of the powdered urea-organic compound condensate in aqueous solutions or emulsions and in plastics. Any suitable surfactant may be used such as ionic, cationic and non-ionic surfactants. The urethane catalyst and surfactants may be used in the amount of 0.25 to 10 percent by weight, percentage based on the weight of the Urea-organic compound condensate.

Any suitable polylurethane blowing agent may be used such as halogenated alkanes, alkanes, compressed air, organic gases, etc. Compounds which decompose at temperatures above room temperature with liberation of gases may also be used as a blowing agent. The blowing agent may be used in the amount of 1 to 20 percent by weight, percentage based on the weight of the urea-organic compound condensate.

COMPONENT D

Any suitable carbonizabon auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose.

Urea-organic compound condensates will react with a phosphorus containing compound, under conditions sufficient to prepare an urea-organic compound condensate salt of a phosphorus containing compound. Suitable inorganic phosphorus compounds include, but not limited to, phosphoric acid, pyrophosphoric acid, triphosphoric acid, metaphosphoric acid, phosphorous acid, hydrophosphorous acid, phosphinic acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkali metal dihydrogen phosphate and halogenated phosphate-phosphite and their halides and acids. Organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic diphosphonate esters, aryl phosphites, aryl hydrogen phosphates, halogenated phosphonates esters and mixtures thereof. Urea-organic compound condensate salts of borates may be produced by contacting boric acid and urea-organic compound condensate under conditions sufficient to prepare the urea-organic compound condensate salts of borates which may also be utilized as a flame-retardant compound. Urea-organic compound condensate salt of boron-phosphates may be produced by contacting boron-phosphates and urea-organic compound condensates under conditions sufficient to prepare urea-organic compound condensate salt of boron-phosphate compounds which may also be utilized as a flame-retardant compound. The salt forming phosphorus containing compounds will react with the urea-organic compound condensate to form an urea-organic compound condensate salt of a phosphorus containing compound.

Suitable inorganic nitrogen containing compounds and/or organic nitrogen containing compounds such as, but not limited to, ammonium phosphate, diammonium phosphate, ammonium polyphosphate, ammonia borate, ammonium hydrogen sulfate, quaternary ammonium salts, ammonium bicarbonate, ammonium carbonate, amino compounds, amines, polyamines, amides, polyamides, nitriles, polynitriles, etc. and mixtures thereof may be added with the organic compounds and reacted with the urea or maybe added after the urea and organic compound has reacted then reacted with the urea-organic compound condensates. The urea-organic compound condensate will further react with compounds by the urea-organic compound condensate being heated and losing more ammonia to form reactive radicals.

The nitrogen containing salts of phosphorus acids are the preferred carbonization compounds. The carbonization agents and other flame retardant agents may be used in the amount of 1 to 300 parts by weight.

COMPONENT G

Any suitable organic material which is more flammable than the urea-organic compound condensates, its salts and urea-organic compound condensate-aldehyde resin may be used in this invention. Any suitable plastic resin composition or mixtures thereof and any suitable natural organic material maybe used in this invention and mixtures thereof. These materials may be in the form of a solid, cellular suspension, emulsion or solution. Suitable plastic resin include, but not limited to, vinyl dienes, vinyl-diene copolymers, polyesters, polyester resins, phenoplasts, aminoplasts, polyepoxy resins, polyurethanes, furans, polyamides, polyimides, polycarbonates, homopolymers of such olefins as ethylene, propylene, and butylene; block copolymers, consisting of optional combination of these olefins; polymers of vinyl compounds such as vinyl chloride, acrylonitrile, methyl acrylates, vinyl acetates and styrene; copolymers of the foregoing olefins with vinyl monomers, copolymers and terpolymers of the foregoing olefins, with diene compounds; polyesters such as polyethylene terephthalate, polyester resins; polyamides such as nylon; polycarbonates, polyoxymethylene, silicones, polyethers, thioplasts, polytetrafluoroethylene, polysulfones, vinyidienes, poly (vinyl acetate), aliphatic allyl compounds, polyacrylonitrile, aliphatic dienes, polybutadiene, butadiene-acrylonitrile, butadiene-styrene copolymers, aromatic vinyl compounds, heterocyclic vinyl compounds, cyclic unsaturated compounds, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include but not limited to wood, cellulose, lignin-cellulose, paper, cotton, wool, linen, dammars, copols, other natural resins, rosins lignin, natural rubber, natural proteins, e.g., soya bean protein, silk, glues, gelatin, etc.; modified cellulose, carbohydrates and mixtures thereof. Natural organic material and plastics may be mixed together. The urea-organic compound condensates, its salts and urea-organic compound condensate-aldehyde resin or urea-organic compound condensate composition maybe utilized in the amount of 10–200 percent, percentage based on the weight of the flammable organic material. The said flame retardant compounds may be mixed in, reacted with or applied on the flammable organic material.

Any suitable basic or acidic catalyst may be used in the reaction of urea-organic compound condensates with aldehydes. Suitable basic compounds include but not limited to, compounds containing alkali metal, alkaline earth metal and ammonia radicals and mixture thereof. Suitable acidic compounds include, but not limited to, halogen acids, acidic phosphorus containing compounds, acidic compounds containing sulfur, sulphonic acid halides, carboxylic acids, polycarboxylic acids, nitric acids and mixtures thereof. In some reactions basic or acidic catalytic are not necessary. The carbonization compounds may be utilized as the catalyst. A catalytic amount is utilized.

COMPONENT E

Any suitable aldehyde may be reacted with the amino condensation compounds. Suitable aldehydes include, but not limited to, formaldehyde, paraformaldehyde, acetoaldehyde, butyraldehyde, chloral, and other alkyl aldehydes, furfural, benzyl aldehyde and other aromatic aldehydes. The aldehydes are utilized in the amount of 20 to 100 parts by weight. Aqueous formaldehyde is the preferred aldehyde.

COMPONENT F

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, silica, metals, metal oxides, carbonates, sulphates, phosphates and borates, glass beads or hollow glass beads. Hydrated aluminum oxide is preferred. They may be organic substances, such as, amino compounds, such as urea, melamine, dicyandiamide, and other cyanuric derivatives or their formaldehyde resins, aminophosphates, amino salts of organic phosphates, phenol-aldehyde resin powder, powdered coke, graphite, graphite compounds, carbohydrates, cellulose, wood powder and mixtures thereof. The organic halide flame retardant compounds may also be added as fillers. The filler may be used in the amount of 1 to 300 parts by weight.

ILLUSTRATIVE EMBODIMENTS

In general, the urea-organic compound condensates are produced by heating urea with other reactive organic compounds that will condensate or react with urea to produce urea-organic compound condensates. The heated urea first form isocyanic acid and/or cyanic acid which polymerizes with itself to form a mixture of cyanuric acid and cyamelide and/or biuret. The components of this invention may be added and mixed in any suitable order. Usually the urea and organic compound are mixed together and heated first then water maybe added to form an emulsion. The urea may be heated to form a urea condensate then mixed with water then reacted with the organic compound, or the urea and water is heated together to form a partially hydrolyzed urea condensate then it is reacted with the organic compound, or the urea maybe heated to form a urea condensate then further heated with water then reacted with the organic compound, or the urea-organic compound condensate may be heated with water to partially hydrolyzed urea-organic compound condensate When urea is heated above the melting point of urea with another reactive organic compound under ambient or elevated pressures, such as alcohols, polyalcohols, epoxies, polyepoxies, isocyanates, polyisocyanates, etc. or other reactive organic compounds a different resin or compound is formed. When one or more moles of urea are reacted with one mol of a reactive organic compounds, such as a carbohydrate, new resin or compound are formed.

Any amount of the urea-organic compound condensate or the urea-organic compound condensate composition which includes the urea-organic compound condensate and/or its salts and urea-organic condensate-aldehyde resin may include carbonization auxiliaries and fillers suitable for this invention may be utilized. Preferably, flame retardant amounts of the urea-organic compound condensate and/or its salts and/or the urea-organic compound condensate-aldehyde resin or the urea-organic compound condensate composition are from 10 percent by weight to about 200 percent by weight of the otherwise more flammable organic materials such as polyester resins, polyepoxy resins, polyurethane components, acrylic and acrylate resins, polyacrylonitrile, polystyrene, water based resins, etc.

One method to measure this flame retardant capability is an oxygen index test. By selecting the various combinations of the urea-organic compound condensate composition to incorporate into a more flammable organic material the average limiting oxygen index (LOI) can be raised 10 to 30 percent or more when compared to otherwise comparable samples without the flame retardant urea condensation composition. For example three flexible polyurethane foams with the urea-organic compound condensate composition were raised more than 30 percent to a LOI of 31.7, 30.3 and 30.7.

When the urea-organic compound condensate composition were incorporated into rigid polyurethane foam and tested with a Bunsen burner's 2" flame held against the foam for one minute, the flame did not spread, a char was formed, and the flame went out when the flame was removed.

Various urea-organic compound condensates or compositions were incorporated into solid resins, for example, flexible polyepoxy resins, rigid polyepoxy resins, polyester laminating and flexible resin, polystyrene resin, polymethyl methyl acrylate resin, polyvinyl acetate resin, solid polyurethane, polyisoprene, acrylonitrile, etc, then tested with a Bunsen burner having a 2" flame, and held against the sample for one minute, the flame did not spread, and went out when the flame was removed. The said above material were tested without the urea-organic compound condensate composition and all burned.

Various natural products such as wood shingles, paper, cotton cloth, and cardboard were coated with various urea-organic compound condensate compositions in an aqueous emulsion containing 20% by weight of the powdered urea-organic compound condensate composition then after the product had dried, they were tested by applying a 2" flame from a Bunsen burner against the products, and the flame did not spread whereas the non-coated products caught on fire and burned.

The ratio of essential reactants and optional reactants which leads to the production of flame retardant compounds and compositions of this invention may vary, broadly speaking, with ranges listed with each component.

DESCRIPTION OF PREFERRED EXAMPLES

The present invention will now be explained herein-after by way of a few examples and comparative examples, these examples setting, however, no limits to this invention. Parts and percentages are by weight, unless otherwise indicated.

Example 1

100 parts by weight of urea and 50 parts by weight of sugar are heated to above the melting point of urea and up to about 160 degree C. at ambient pressure for 0.1 to 1 hour. Ammonia evolves from the melted urea thereby producing a urea-sugar condensate. The cooled urea-sugar condensate is ground into a fine powder. The fine powder may be added to water to form an emulsion which may be utilized with a polyisocyanate to form flame retardant polyurethane product or added to water based plastics or melted plastics.

Example 2

100 parts by weight of urea and 50 parts by weight of diethylene glycol are mixed then heated to above the melting point of urea and up to 160 degree C. for 0.5 to 1 hours. Ammonia evolves from the mixture thereby producing a urea-diethylene glycol condensate. Water in the amount of 25 parts by weight is added to the urea-diethylene glycol condensate to form an emulsion which maybe reacted with polyisocyanates to produce foam.

Example 3

Example 2 is modified wherein 300 parts by weight of urea is used instead of 100 parts by weight.

Example 4

Example 2 is modified wherein another carbohydrate, in the amount of 100 parts by weight, is used in place of sugar and selected from the list below:

a) corn syrup
b) dextrose
c) sucrose
d) fructose
e) glucose
f) starch
g) sugar cane syrup
h) molasses
i) maltose
j) sorbitol
k) mannose
l) glactose
m) lactose

Example 5

About 100 parts by weight of the urea-sugar condensate compound of example 1 is mixed with 25 parts by weight of phosphoric acid (75%) (carbonization compound) then heated to above the melting point of the urea-sugar condensation compound for about 30 minutes thereby producing a urea-sugar condensate salt of phosphoric acid.

Example 6

Example 5 is modified by first reacting 5 parts by weight of boric acid with the 25 parts by weight of phosphoric acid thereby producing a boron-phosphate condensation compound (carbonization compound) and utilizing it in place of the phosphoric acid in example 5.

Example 7

Example 5 is modified wherein another phosphorus containing compound is utilized in place of phosphoric acid and selected from the list below:

a) pyrophosphoric acid
b) phosphinic acid
c) phosphorus trichloride
d) phosphorus oxytrichloride
e) phosphorus oxide
f) ammonium dihydrogen phosphate
g) mono-aluminum phosphate
h) dimethyl methyl phosphonate (DMMP)
i) dimethyl hydrogen phosphite
j) phenyl acid phosphate
k) methylchlorophosphine
l) phosphorus
m) phosphorus thiochloride
n) tris(2-chloropropyl) phosphate
o) triphenyl phosphite
p) tris 2-chloroethyl phosphite
q) triethyl phosphite
r) urea dihydrogen phosphate
s) diethyl phosphite
t) trimethyl phosphite
u) dibutyl pyrophosphoric acid
v) melamine hydrogen boron-phosphate
x) hypophosphorous acid
y) methyl amine salt of phosphoric acid
z) O,O-dimethyl hydrogen dithiophosphate

Example 8

Example 1 is modified wherein 20 parts by weight of a phosphorus containing compound selected from the list in example 7 is added to the urea before it is heated thereby producing a mixture of urea-sugar condensate salt of a phosphorus containing compound and urea salt of a phosphorus containing compound. The mixture is ground into a fine powder.

Example 9

30 parts by weight of the melted urea-diethylene glycol condensate of example 2 are added to 50 parts by weight of a polypropylene triol with a 56 hydroxyl number and a mol wt. of 3000 thereby producing a stable emulsion for use in the production of flame retardant polyurethane products.

Example 10

Example 5 is modified wherein 20 parts by weight of powdered dimelamine phosphate is added to and mixed in with the melted urea-diethylene glycol condensate compound thereby producing a flame retardant urea-diethylene glycol condensate composition.

Example 11

Example 3 is modified wherein 25 parts by weight of melamine powder are added to and mixed in with the melted urea-diethylene glycol condensate compound thereby producing a flame retardant urea-ethylene glycol condensate composition.

Example 12

100 parts by weight of urea, 50 parts by weight of adipic acid are mixed then heated above the melting point of urea and up to 160 degree C. for 45 minutes while agitating. Ammonia evolves from the solution, The urea-adipic acid condensate compound is cooled, forms a solid, thereby producing a flame retardant urea-adipic acid condensate.

Example 13

100 parts by weight of urea, 30 parts by weight of malic acid are mixed then heated above the melting point of urea and up to 160 degree C. for 0.5 to 1 hour. Ammonia evolves from the mixture. The mixture produces a flame retardant urea-malic acid condensate.

Example 14

100 parts by weight of urea, 30 parts by weight of cellulose powder are mixed then heated above the melting point of urea and up to 160 degree C. for 40 minutes thereby producing a urea-cellulose condensate. After cooling it is ground into a fine powder.

Example 15

Example 14 is modified wherein 10 parts by weight of a phosphorus salt forming compound selected from the list below is added to and reacted with the urea-cellulose condensate:

a) phosphoric acid
b) pyrophosphoric acid
c) dimethyl methyl phosphonate (DMMP)
d) dimethyl hydrogen phosphite
e) trimethyl phosphite
f) phenyl acid phosphate
g) phosphorus trichloride

Example 16

Example 2 is modified wherein 20 parts by weight of a halogenated flame retardant compound selected from the list below is mixed with the powdered urea-sugar condensate of example 1, thereby producing a flame retardant urea-organic compound condensate composition:

a) brominated epoxy olgmer
b) decabromodiphenyl oxide
c) pentabromodiphenyl oxide
d) 2,3-dibromopropanol
e) octabromodiphenyl oxide
f) tris (dichloropropyl) phosphite
g) tris(dichloropropyl) phosphite

Example 17

Example 3 is modified wherein 20 parts by weight of a powdered filler selected from the list below is mixed with the powdered urea-diethylene glycol condensate of example 2, thereby producing a flame retardant urea-diethylene glycol condensate composition:

a) hydrated aluminum oxide powder
b) hydrated sodium silicate powder
c) melamine
d) dicyandiamide
e) urea
f) melamine phosphate
g) melamine borate
h) ammonium phosphate
i) ammonium pyrophosphate
j) ammonium carbonate
k) ammonium borate
l) ammonium sulfamate
m) guanidine
n) guanidine carbonate
o) urea phosphate
p) silica powder
q) phenol-formaldehyde resin powder
r) aluminum phosphate
s) thiourea
t) hollow beads
u) expandable graphite
v) melamine salt of DMMP
r) ammonium sulfate
s) magnesium chloride
t) antimony trioxide
u) boron-phosphate powder
w) melamine boron-phosphate powder
x) ammonium boron-phosphate powder

Example 18

30 parts by weight of the urea-diethylene glycol condensate of example 2 are mixed and reacted with 10 parts by weight of dimethyl methyl phosphonate (DMMP) thereby producing a urea-diethylene glycol condensate salt of DMMP compound, then it was added and mixed with 60 parts by weight of a flexible polyepoxy resins with its polyamine curing agent. The resin is cured then was tested with a 2" Bunsen burner flame held against sample for 1 minute. The flame did not spread and the flame went out when the torch was removed.

Example 19

30 parts by weight of the urea-diethylene condensate and dimelamine phosphate composition of example 10 are mixed with 70 parts by weight of flexible polyester resin containing its catalyst. The resin is cured then flame tested using a Bunsen burner with a 2" flame held against the sample for 1 minute. The flame did not spread and went out when the torch was removed.

Example 20

30 parts by weight of the urea-sugar condensate of example 1 is incorporate into 70 parts by weight of a flexible polyurethane foam produced from MDI and a triol which weighs about 1.75 lbs./cu.ft. The foam was flame tested by using Calif. T133 Test wherein 100 gms of wood is burned on top of the foam. After burning the wood on the foam there was a 50.5 gms weight loss. A weight loss of less than 60 gms is necessary to pass the test.

Example 21

30 parts by weight of the urea-corn syrup condensation compound of example 4a are mixed with 1 part by weight of a silicone surfactant for polyurethane foams and 40 parts by weight of MDI. The mixture foams, hardens and produces a rigid foam of about 1.75 lbs./cu. ft. This foam was flame tested using a 2" Bunsen burner flame which was placed against the foam for 1 minute. The flames did not spread.

Example 22

Example 14 is modified wherein 20 parts by weight of an amino phosphorus containing compounds which is selected from the list below and mixed in with the urea-cellulose condensate:

a) dimelamine phosphate
b) dicyandiamide phosphate
c) urea dihydrogen phosphate
d) guanidine phosphate
e) aminoguanidine phosphate
f) diethyltriamine urea phosphate
g) melamine salt of dimethyl methyl phosphonate
h) melamine salt of dimethyl hydrogen phosphite
i) methylamine melamine phosphoric acid
j) methyl carbamate salt of phosphoric acid
k) melamine salt of boron-hydrogen phosphate
l) O-methyl urea
m) urea salt of boron-phosphate
n) urea-formaldehyde phosphate
o) aminophenol phosphate
p) ammonium urea phosphate
q) ammonium melamine phosphate
r) melamine salt of trimethyl phosphite
s) melamine salt of phenyl acid phosphate

Example 23

Example 1 is modified wherein the urea-sugar condensate is heated and reacted with 20 percent by weight of urea, percentage based on the weight of the urea-sugar condensate.

-continued h) phosphinic add
i) phosphorus oxytrichloride
j) ammonium dihydrogen phosphate
k) dimethyl phosphoric acid
l) diethyl ethyl phosphonate
m) magnesium hydrogen phosphate
n) mono aluminum phosphate

Example 24

Example 2 is modified wherein the urea is first heated and reacted with itself to form a urea condensate then the diethylene glycol is added and heated for 15 minutes at 140–160 degree C., ammonia is produced in the reaction, thereby producing urea-diethylene glycol condensate.

Example 25

Example 2 is modified wherein 50 parts by weight of adipic acid is added with the urea and diethylene glycol thereby producing a urea-polyester condensate resin.

Example 26

Example 25 is modified wherein another polycarboxylic acid or anhydride is use in place of adipic acid and selected from the list below:

| | |
|---|---|
| a) oxalic acid | b) malonic acid |
| c) succinic acid | d) glutaric acid |
| e) pimelic acid | f) suberic acid |
| g) azelaic acid | h) sebacic acid |
| i) phthalic acid | j) terephthalic acid |
| k) phthalic anhydride | |

Example 27

Example 25 is modified wherein another polycarboxylic acid or anhydride is used in place of adipic acid and selected from the list below thereby producing an unsaturated urea-polyester condensate resin:

| | |
|---|---|
| a) maleic acid | b) fumaric acid |
| c) itaconic acid | d) maleic anhydride |

Example 28

Example 25 is modified wherein 30 parts by weight of an oil is added with the urea and diethylene glycol and selected from the group below:

| | |
|---|---|
| a) soya bean oil | b) linseed oil |
| c) cotton seed oil | d) castor oil |
| e) dehydrated castor oil | f) tall oil |
| g) tung oil | h) fish oil |
| i) sunflower oil | j) safflower oil |

Example 29

100 parts by weight of urea, 30 parts by weight of ethylene oxide and 10 parts by weight of water are placed in a closed container and under sufficient pressure to keep the ethylene oxide to be in a liquid form while the mixture is being heated to above the melting point of urea, then a catalytic amount of boron flouride is added and the mixture is heat for 0.1 to 1 hour while agitating thereby producing a urea-ethylene oxide condensate. 100 parts by weight of the urea-ethylene oxide condensate is mixed with 25% by weight of water, percent is based on the weight of the urea-ethylene oxide condensate, to form an emulsion then mixed with 1 part by weight of a silicone surfactant for foam control and 100 parts by weight of MDI. The mixture foams and expands into a semi-rigid polyurethane foam. The foam is flame tested with a 2" Bunsen burner flame which is placed against the foam for 1 minute. The flame did not spread and went out when the flame was remove.

Example 30

100 parts by weight of urea are placed in a closed vessel then heated to the melting point of urea then the pressure is increased sufficient to keep the components in a liquid state and 30 parts by weight of phosgene is pumped into the closed vessel thereby producing a urea-phosgene condensate and ammonium chloride.

Example 31

Example 30 is modified wherein another organic compound is added in place of phosgene and selected from the list below thereby producing a urea-organic compound condensate:

| | |
|---|---|
| a) ethyl alcohol | b) Proplylene oxide |
| c) acetylene | d) vinyl acetate |
| e) acrylonitrile | f) N-vinyl-2-pyrrolidone |
| g) epichlorohydrin | h) phenol |
| i) isoprene | j) cyanogen chloride |
| k) allyl chloride | l) allyl alcohol |
| m) propyl alcohol | n) acetone |
| o) acetic acid | p) acetyl chloride |
| q) nitroethane | r) glycerol |
| s) dimethyl hydrogen phosphite | t) chlorohydrin |
| u) trimethylene oxide | v) vinyl chloride |
| w) sulfur dioxide | x) formaldehyde |
| y) vinylene chloride | Z) vinylidene cyanide |

Example 32

100 parts by weight of urea, 100 parts by weight of corn syrup and 50 parts of weight of an amino compound selected from the group below are mixed then heated to 140 to 170 degree C. for 0.1 to 1 hour thereby producing a urea-carbohydrate-amino condensate.

| | |
|---|---|
| a) melamine | b) dicyandiamide |
| c) aminoguanidine | d) guanidine carbonate |

Example 33

Example 32 is modified wherein 50 parts by weight of concentrated aqueous formaldehyde is mixed with the urea-carbohydrate-amino condensate and heat to below the boiling of the aqueous formaldehyde for 1–2 hours thereby producing a urea-carbohydrate-amino-formaldehyde resin.

Example 34

30 parts by weight of the urea-sugar condensate of example 1, 5 parts by weight of water is added and mixed to form an emulsion, 0.5 parts by weight of a silicone surfactant and 0.5 parts by weight of a urethane amine catalyst are added to the emulsion then 30 parts by weight of MDI are added, mixed and reacted. The mixture expands to produce a semi-rigid polyurethane foam of about 1.75 lbs./cu.ft. The foam was flame tested with a 2" Bunsen burner flame place against the foam for 1 minute. The flame did not spread and it went out when the flame was removed.

Example 35

Example 34 is modified wherein another polyisocyanate is used in place of MDI and selected from the list below:

| a) TDI (MONDUR TD80 by Bayer) | b) polymeric MDI (MONDUR MR by Bayer) |
| c) TDI (MONDUR HR by Bayer) | d) MDI (by ICI) |
| e) MDI (MONDUR MRS by Bayer) | F) polymeric MDI (PAPI 27 by DOW) |

Example 36

100 parts by weight of urea is heated at 140–160 degree C. for 20 minutes thereby producing a urea condensate, then 30 parts by weight of water with 1 part by weight of a silicone surfactant and 1 part by weight of a urethane catalyst are add and mixed to form an emulsion, then 120 parts by weight of MDI is added and mixed. The mixture expands to form a flame retardant rigid polyurethane foam.

I claim:

1. A flame retardant composition provided by incorporating a urea-organic condensate-aldehyde resin, and/or a urea-organic compound condensate-aldehyde resin salt of phosphorus and/or boron and/or urea-organic condensate-aldehyde resin composition in a more flammable organic material, under reaction conditions and in an amount sufficient to reduce the combustibility of the flammable organic material, said flame retardant composition produced by the process comprising of mixing, heating and reacting the following components:

(A). Urea
(B) organic compound that will condensate or react with urea
(C) water
(D) carbonization auxiliaries
(E) aldehyde
(F) filler components A and B are first heated and reacted to produce a urea-organic compound condensate, then components C and D are added and mixed, then component E is added and reacted, and then component F is added and mixed.

2. A flame retardant composition of claim 1 wherein the organic compound component (B) is selected from the group consisting of organic saturated, unsaturated or substituted compounds which may be an aliphatic, aromatic, cyclic, aliphatic-aromatic or aliphatic-cyclic compound such as, but not limited to, alcohols, polyalcohols, epoxides, polyepoxides, epihalohydrins, organic acids, polycarboxylic acids and hydrides, thioalcohols, phenols, thiophenols, halogenated alcohols and polyalcohols, halogenated organic compounds, halogenated organic acids and polycarboxylic acids, sulphonic acid chlorides, organic ester, organic ethers, thioethers, ketones, nitriles, sulphonic acids, imides, alkyl carbonates, oils, fats, carbohydrates, cellulose, lignin, wood, acrylic acid, alkyl acrylic acids, allyl alcohol, polyvinyl alcohol, organic phosphates, phosphites, phosphonates and phosphorus esters, alkylchlorophosphines, phosgene, ammonium carbonate, alkyl carbamates, alkyl isocyanates, polyisocyanates, sulfamic acid, ammonium sulfamate, amino compounds, amines, polyamines,, thioureas, alkylanolamine, polyamides with free $—N_2$ or —COOH radicals, amidines, amides, aldimines, ketimines, polyester with free —OH or COOH radicals and mixtures thereof; in the amount of 25 to 200 parts by weight.

3. A flame retardant composition of claim 1 wherein the organic compound component (B) that will condensate and/or react with isocyanic acid and/or cyanic acid, produced by heating urea, is selected from the group consisting of urea, biuret, amines, polyamines, urea derivatives, thiourea, thiourea derivatives, guanidine carbonate, urea carbonates, ammonium bicarbonate and mixtures thereof and added with the organic compound (component B), in the amount of 25 to 200 parts by weight.

4. The flame retardant composition of claim 1 wherein the carbonization auxiliaries are selected from the group consisting of phosphorus containing compounds, boron containing compounds, boron-phosphate containing compounds and sulfur containing compounds that produce acidic components in the pyrolysis mixture; in an amount of 1 to 300 parts by weight.

5. The flame retardant composition of claim 1 wherein the filler is selected from the group consisting of urea, melamine, dicyandiamide, melamine cyanurate, amino phosphates, aminopolyphosphates, aminoplasts, phenoplasts, powdered synthetic resins, sawdust, carbohydrates, bituminous additives, graphite, graphite compounds, cyanuric derivatives or their formaldehyde resins, powdered coke, silica, alkali metal silicates, alkaline earth metal silicates, metals, metal silicates, oxides, carbonates, sulphates, phosphates and borates, glass beads, hollow glass beads, hydrated aluminum oxide, carbohydrates, cellulose, wood powder and mixtures thereof; in an amount 1 to 300 percent by weight percentage based on the weight of the urea.

6. The flame retardant composition of claim 1 wherein the aldehyde is an aqueous formaldehyde, in the amount of 20 to 100 parts by weight.

7. The flame retardant composition of claim 1 wherein the urea-organic compound condensate-aldehyde resin is a urea-carbohydrate condensate-aldehyde resin.

8. The flame retardant composition of claim 1 wherein the urea-organic compound condensate-aldehyde resin is a urea-polyalcohol condensate-aldehyde resin.

9. The flame retardant composition of claim 1 wherein the urea-organic compound condensate-aldehyde resin is a urea-polyester condensate-aldehyde resin.

10. The flame retardant composition of claim 1 wherein the urea-organic condensate-aldehyde resin and/or urea-organic condensate-aldehyde resin composition and/or urea-organic compound condensate-aldehyde resin salt of phosphorous and/or boron is utilized in an amount of 10 to 200 percent by weight, wherein said percentage is based on the weight of the more flammable organic material.

11. The flame retardant composition of claim 1 wherein the urea-organic compound condensate is urea-polyisocyanate condensate.

12. The flame retardant composition of claim 1 wherein the carbonization auxiliaries is a phosphorus containing compounds that is react with the urea-organic compound condensate.

13. The flame retardant composition of claim 12 wherein the phosphorus containing compound is an acidic phosphorus containing compound thereby producing a urea-organic compound condensate salt of a phosphorus compound.

14. The flame retardant composition of claim 13 wherein the acidic phosphorus compound is phosphoric acid.

15. The flame retardant composition of claim 13 wherein the phosphorus containing compound is an organic phosphorus containing compound.

16. The flame retardant composition of claim 15 wherein the organic phosphorus compound is dimethyl methyl phosphonate.

17. A method for reducing combustibility of a more flammable organic material comprising incorporating a urea-organic condensate-aldehyde resin and/or a urea-organic compound condensate-aldehyde resin salt of phosphorous and/or boron and/or urea-organic condensate-aldehyde resin composition with the more flammable organic material, under reaction conditions of the organic material and in an amount sufficient to reduce the combustibility of the flammable organic material, said urea-organic condensate-aldehyde resin and/or a urea-organic compound condensate-aldehyde resin salt of phosphorous and/or boron and/or urea-organic condensate-aldehyde resin composition produced by the method comprising of mixing, heating and reacting the following components wherein all percentages are based on weight of urea:

(A) urea in an amount of 50 to 100 parts by weight;

(B) organic compound that will condensate and/or react with isocyanic acid and/or cyanic acid produced by heating a urea compound in an amount of 25 to 300 parts by weight; then add (C) water in an amount of 1 to 200 parts by weight; then add and/or react (D) carbonization auxiliaries in an amount of 1 to 300 parts by weight; then add and react (H) aldehyde in an amount of 20 to 100 parts by weight; then add and mix in (I) filler in an amount of 1 to 300 parts by weight.

18. The method of claim 17 wherein component B is selected from the group consisting of organic saturated, unsaturated or substituted compounds which may be an aliphatic, aromatic, cyclic, aliphatic-aromatic or aliphatic-cyclic compound such as, but not limited to, alcohols, polyalcohols, epoxides, polyepoxides, epihalohydrins, organic acids, polycarboxylic acids and hydrides, thioalcohols, phenols, thiophenols, halogenated alcohols and polyalcohols, halogenated organic compounds, halogenated organic acids and polycarboxylic acids, sulphonic acid chlorides, organic ester, organic ethers, thioethers, ketones, nitrites, sulphonic acids, imides, alkyl carbonates, oils, fats, carbohydrates, cellulose, lignin, wood, acrylic acid, alkyl acrylic acids, allyl alcohol, polyvinyl alcohol, organic phosphates, phosphites, phosphonates and phosphorus esters, alkyl chlorophosphines, phosgene, ammonium carbonate, alkyl carbamates, alkyl isocyanates, polyisocyanates, sulfamic acid, ammonium sulfamate, amino compounds, amines, polyamines,, thioureas, alkylanolamine, polyamides with free —$NH_2$ or —COOH radicals, amidines, amides, aldimines, ketimines, polyester with free —OH or COOH radicals and mixtures thereof; in the amount of 25 to 200 parts by weight.

19. The method of claim 17 wherein the urea-organic condensate-aldehyde resin is a urea-carbohydrate condensate-aldehyde resin.

20. The method of claim 17 wherein the urea-organic compound condensate-aldehyde resin is a urea-corn syrup-polyisocyanate condensate-aldehyde resin.

21. The product produced by the method of claim 17.

* * * * *